(12) United States Patent
Li et al.

(10) Patent No.: US 11,914,573 B2
(45) Date of Patent: Feb. 27, 2024

(54) COLUMN BASED DATABASE LOCKS

(71) Applicant: International Business Machines Corporation, Armonk, NY (US)

(72) Inventors: Shuo Li, Beijing (CN); Xiaobo Wang, Beijing (CN); Hong Mei Zhang, Beijing (CN); Sheng Yan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 17/656,068

(22) Filed: Mar. 23, 2022

(65) Prior Publication Data

US 2023/0306012 A1  Sep. 28, 2023

(51) Int. Cl.
*G06F 16/00* (2019.01)
*G06F 16/23* (2019.01)
*G06F 16/22* (2019.01)

(52) U.S. Cl.
CPC ...... *G06F 16/2343* (2019.01); *G06F 16/2255* (2019.01); *G06F 16/2365* (2019.01)

(58) Field of Classification Search
CPC ............... G06F 16/2343; G06F 16/273; G06F 16/1774; G06F 16/21; G06F 16/2246; G06F 16/2322; G06F 16/2365; G06F 3/0604; G06F 3/0637; G06F 3/0673; G06F 9/52; G06F 11/1402; G06F 16/182; G06F 16/1824; G06F 16/2228; G06F 16/2272; G06F 16/2315; G06F 16/235; G06F 16/24554; G06F 16/24578; G06F 16/27; G06F 16/334; G06F 9/526; G06F 16/245; G06F 16/24561; G06F 16/951; G06F 16/2358; G06F 16/2393; G06F 16/24534; G06F 3/0481; G06F 30/20; G06F 16/144; G06F 16/215; G06F 16/23; G06F 16/242; G06F 16/2428; G06F 16/243; G06F 16/2453; G06F 16/2455; G06F 16/285; G06F 16/9535

See application file for complete search history.

(56) References Cited

U.S. PATENT DOCUMENTS

| | | | |
|---|---|---|---|
| 7,051,041 B1 * | 5/2006 | Miller | G06F 16/2343 |
| | | | 707/999.102 |
| 9,569,481 B1 * | 2/2017 | Chandra | G06F 16/235 |
| 2008/0086470 A1 * | 4/2008 | Graefe | G06F 16/2343 |
| 2012/0310985 A1 * | 12/2012 | Gale | G06F 16/21 |
| | | | 707/792 |
| 2017/0357674 A1 | 12/2017 | Hsieh | |
| 2019/0005083 A1 | 1/2019 | Cook | |

(Continued)

*Primary Examiner* — Shyue Jiunn Hwa
(74) *Attorney, Agent, or Firm* — Stephen R. Yoder

(57) ABSTRACT

Disclosed are techniques for relational database locks based on columns. Database transactions may be targeted to specific columns of one or more records, instead of the entire row for those records, using primary keys. Column locks on specific keys are stored separately than column locks on ranges of keys, which are both checked when requesting a new column lock for either a single key or a range of keys. When a threshold number of columns for a given record, or range of records/keys, have been locked, the column locks for that record, or range of records, can be combined into a single row level lock to reduce resource costs for maintaining multiple concurrent locks.

18 Claims, 10 Drawing Sheets

(56) References Cited

U.S. PATENT DOCUMENTS

2019/0220548 A1 7/2019 Kirkham
2019/0324673 A1* 10/2019 Graefe ................ G06F 16/2343
2020/0050597 A1 2/2020 Sivakumar

* cited by examiner

COLUMN BASED DATABASE LOCKS

BACKGROUND

The present invention relates generally to the field of database management systems, and more particularly to database record locking techniques.

A database management system (DBMS) describes the software that interacts with end users, applications, and the database itself to capture and analyze the data. The DBMS software additionally includes the core facilities provided to administer the database. The complete package of the database, the DBMS and the associated applications can be described as a database system. Frequently, the term "database" is also used loosely to describe any of the DBMS, the database system or an application associated with the database.

A relational database model organizes data into one or more tables (or "relations") of columns and rows, with a unique key identifying each row. Rows are commonly referred to as records or tuples. Columns are also described as attributes. Generally, each table/relation represents one "entity type" (such as customer or product). The rows represent instances of that type of entity (such as "Lee" or "chair") and the columns representing values attributed to that instance (such as address or price). For example, each row of a class table corresponds to a class, and a class corresponds to multiple students, so the relationship between the class table and the student table is "one to many." Each row in a table possesses its own unique key. Rows in a table may be linked to rows in other tables by inserting a column for the unique key of the linked row (such columns are called foreign keys). Part of database processing involves the capacity to consistently select or modify one and only one row in a table. Therefore, most physical database table implementations have a unique primary key (PK) for each row in a table. When a new row is added to the table, a new unique value for the primary key is created; this is the key that the DBMS uses primarily for accessing and manipulating the table. In the relational model of databases, a primary key is a specific choice of a minimal set of columns (or attributes) which uniquely specify a row (or tuple and/or record) in a table (or relation). Informally, a primary key describes "attributes that identify a record," and in simple cases comprise a single attribute: a unique ID.

Record locking describes the technique of preventing simultaneous access to data in a database, to prevent inconsistent results. One simple way to prevent this is to lock the file whenever a record is being modified by any user, such that no other user can save data. This implementation prevents records from being overwritten incorrectly, but only allows one record to be processed at a time, inhibiting other users who need to edit or read records at the same time. To enable several users to edit a database table at the same time while also preventing inconsistencies created by unrestricted access, an individual record can be locked when retrieved for editing or updating. Anyone else attempting to access the same record for editing is denied write access because of the lock (depending on the implementation, however, they may be able to view the record without editing it). Upon saving the record or cancelling the edits, the lock is released. Records can never be saved in a manner to overwrite other changes, preserving data integrity.

Exclusive locks are a type of lock exclusively held by a single entity, frequently for the purpose of writing to the record. If the locking schema was shown as a list, the holder list would contain a single entry. Non-holders of the lock (a.k.a. waiters) can be denoted in a list that is serviced in a round-robin fashion, or in a first-in-first-out (FIFO) queue. Shared locks are distinguished from exclusive locks in that the holder list may include multiple entries. Shared locks enable all holders to read the contents of the locked record knowing that the record cannot be edited until after the lock has been released by all of the holders. Exclusive locks cannot be issued on a record when the record is already locked (exclusively or shared) by another entity. For shared locks, if lock requests for the same entity are queued, upon granting a shared lock, any other queued shared locks for the entity may also be granted. If an exclusive lock is next in the FIFO queue, it must wait until all shared locks have been released.

In addition to shared (S) type locks and exclusive (X) type locks from other locking schemes, like strict two-phase locking, Multiple Granularity Locking (MGL) also uses intentional "locks", that do not lock a node directly, but instead describe the existence, or intent to add, a lock of the specified type lower in the node hierarchy. Intentional locks include several different intentional lock types, such as: (i) "intention shared" (IS), (ii) "intention exclusive" (IX), and (iii) the combined "shared and intention exclusive" (SIX) locks. IS type locks are incompatible with X locks, while IX locks are incompatible with other S and X locks. The null lock (NL) does not conflict with other lock types. To lock a node with S (or X) locks, MGL has the transaction lock on all of the node's ancestors with IS (or IX), so if a transaction locks a node in S (or X), no other transaction can lock the node's ancestors with X (or S and X) type locks.

A hash chain describes the successive application of a cryptographic hash function to a piece of data. In the field of computer security, a hash chain is a technique to produce many one-time keys from a single key or password. For non-repudiation, a hash function may be applied successively to additional subsequent pieces of data in order to record the chronology of data's existence.

SUMMARY

According to an aspect of the present invention, there is a method, computer program product and/or system that performs the following operations (not necessarily in the following order): (i) receiving a relational database transaction for a target relational database table, the relational database transaction including a lock component corresponding to at least one target key with a corresponding at least one target column; (ii) determining a lock compatibility dataset corresponding to whether the lock component of the relational database transaction is compatible with existing locks presently applied to the target database by: (a) comparing the target key and target column to a key hash chain corresponding to locks for specific keys, including column specific locks for a given specific key, and (b) comparing the target column to a column bit array, with the column bit array indicative of which columns have range-column locks present; and (iii) responsive to the lock compatibility data set indicating compatibility between the lock component and the existing locks, adding the lock component to the existing locks.

DETAILED DESCRIPTION

Figure 1:
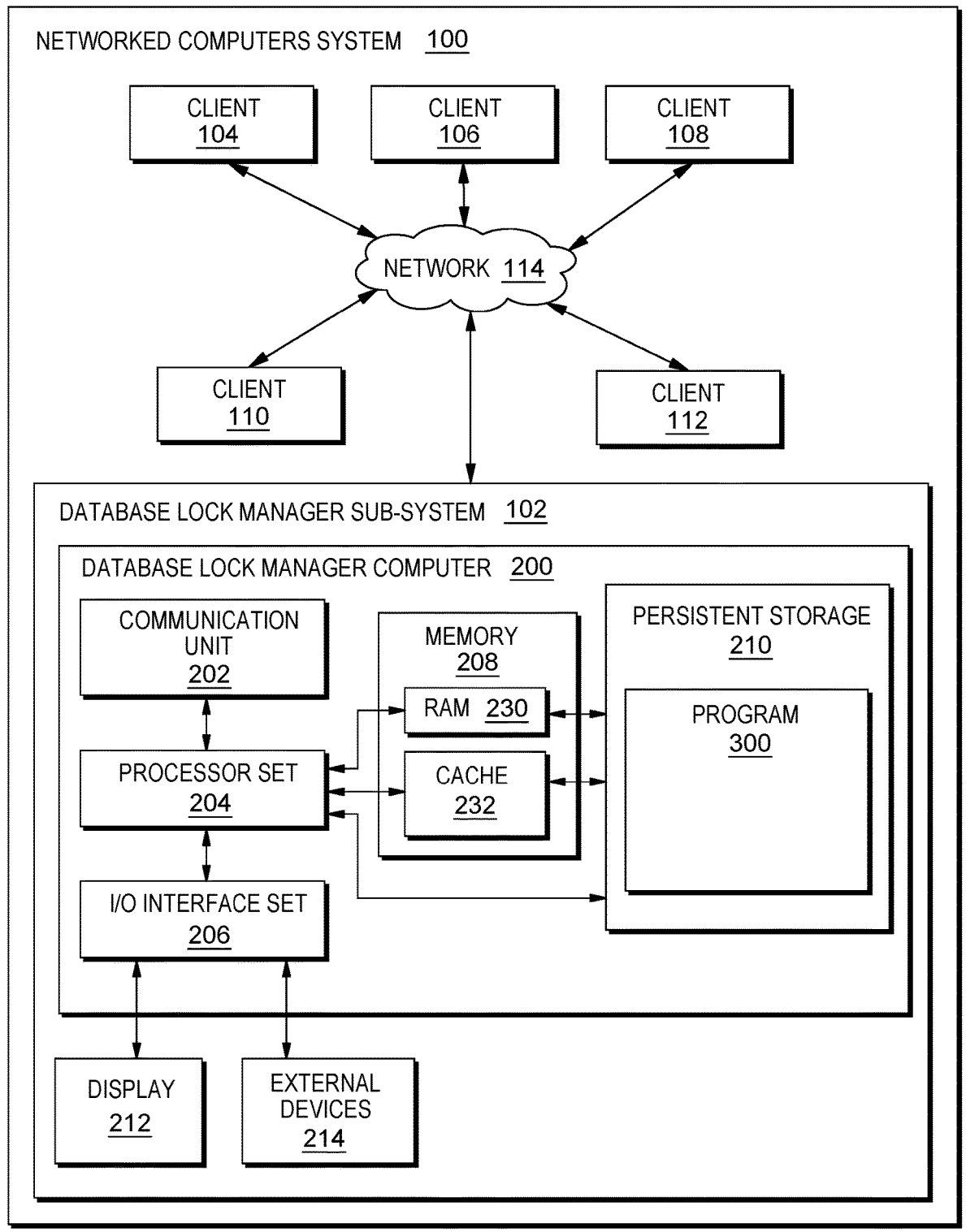
FIG. 1 is a block diagram view of a first embodiment of a system according to the present invention.

Some embodiments of the present invention are directed to techniques for relational database locks based on columns. Database transactions may be targeted to specific columns of one or more records, instead of the entire row for those records, using primary keys. Column locks on specific keys are stored separately than column locks on ranges of keys, which are both checked when requesting a new column lock for either a single key or a range of keys. When a threshold number of columns for a given record, or range of records/keys, have been locked, the column locks for that record, or range of records, can be combined into a single row level lock to reduce resource costs for maintaining multiple concurrent locks.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium (sometimes referred to as "machine readable storage medium") can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention, described in detail with reference to the Figures. Networked computers system 100 includes: database lock manager subsystem 102 (sometimes herein referred to, more simply, as subsystem 102); client subsystems 104, 106, 108, 110, 112; and communication network 114. Subsystem 102 includes: database lock manager computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with lock manager computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
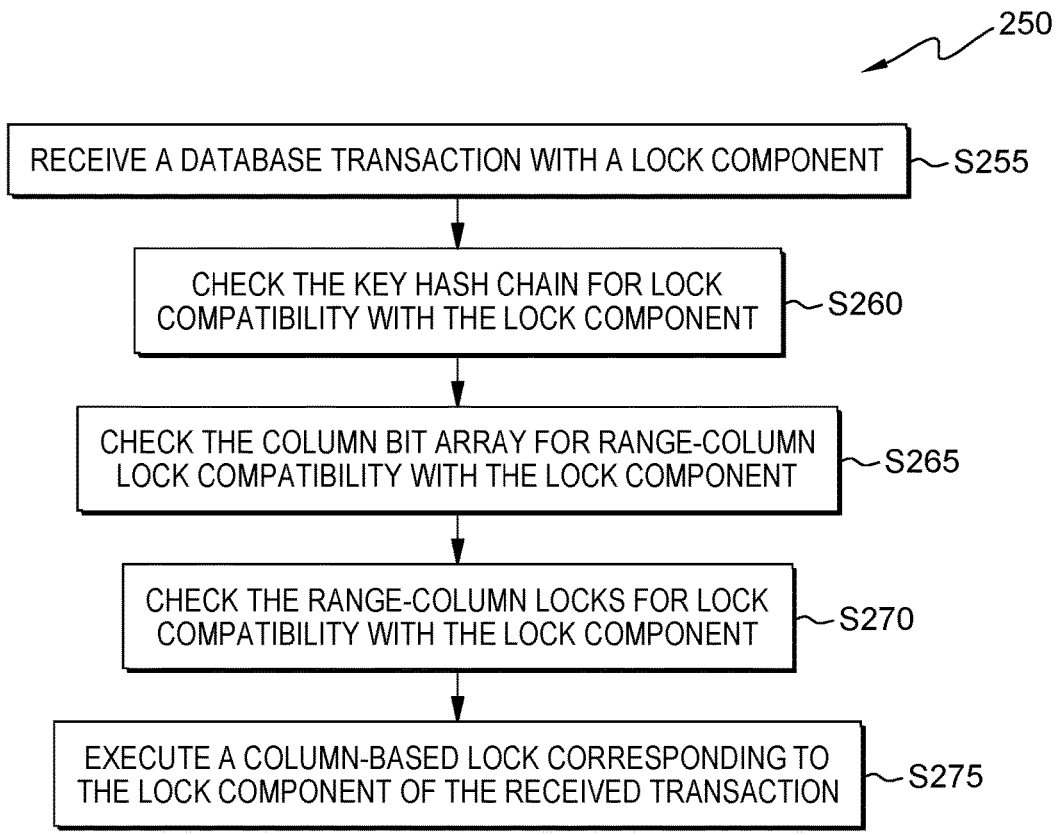
FIG. 2 is a flowchart showing a first embodiment method performed, at least in part, by the first embodiment system.
Figure 3:
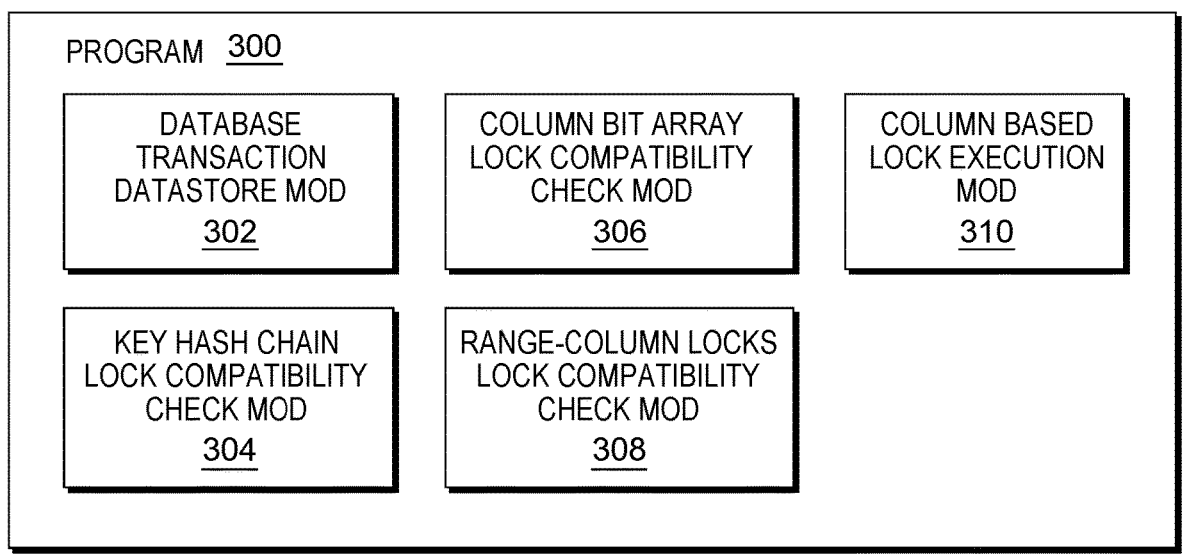
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where database transaction datastore module ("mod") 302 receives a database transaction with a lock component. In this simplified embodiment, the database transaction is a select command on column 2 (the target column) of key 5 (the target key) of a target relational database table, TB1. TB1 has 10 keys, numbered 1 through 10, and three columns, numbered 1 through 3. At the time that this database transaction is received, there are three historical database transactions that have been applied to TB1 and are concurrently active: (i) a first historical database transaction corresponding to an update command on column 1 of keys 1 through 5; (ii) a second historical database transaction corresponding to an update command on column 3 of key 5; and (iii) a third historical database transaction corresponding to an update command on column 2 of keys 1 through 4. These database transactions are historic in that they predate the received database transaction.

For TB1, select commands correspond to locks of the "S" type, or shared locks, for reading data from a table without modifying the data. This is contrasted by update commands, which correspond to locks of the "X" type, or exclusive, for modifying or updating data in the table, such as TB1. When an X type lock is executed on portions of the table, no other locks may be applied to those locked portions of the table, including other instances of X locks. For S type locks, multiple S type locks may be applied to the same portions of a table concurrently, as the separate locks are merely reading the data instead of modifying it. If a portion of a table has an S type lock applied, an X lock cannot be applied to the portion of the table until all the S type locks on that portion are released.

As the received database transaction is a select command on column 2 of key 5 of TB1, the lock component is an S lock on column 2 of key 5 of TB1. This lock component may be compatible (in a concurrent situation where both locks are to be applied concurrently) with other S type locks on column 2 of key 5, but not an X type lock on the same data. If X type locks are applied on key 5, but to different columns, this lock component is also compatible with those X type locks in a concurrent situation, as they apply to different columns of the same key. This lock is an example of a key-column lock, which is a lock that applies to a specific column of an individual key.

For the first historical database transaction corresponding to an update command on column 1 of keys 1 through 5, the corresponding lock component of this transaction, which is presently executed upon TB1, is an X type lock on column 1 for keys 1 through 5. This is an example of a range-column lock according to the present invention, which is a lock on a specified column for a specified range of keys, denoted by a low key (or key 1, in this example) and a high key (or key 5, in this example) and encompasses all the intervening keys between the low key and the high key for the specified column (or column 1, in this example). This type of lock would not apply to any keys outside of the range, or any other columns of the keys within the range that are not the specified column. For the second historical database transaction corresponding to an update command on column 3 of key 5, which is presently executed upon TB1, the corresponding lock component of this transaction, which is presently executed upon TB1, is an X type lock on column 3 for key 5. For the third historical database transaction corresponding to an update command on column 2 of keys 1 through 4, which is presently executed upon TB1, the corresponding lock component of this transaction is an X type lock on column 2 of keys 1 through 4, which is a range-column lock on column 2 for keys 1 through 4.

Processing proceeds to operation S260, where key hash chain lock compatibility check mod 304 checks the key hash chain for lock compatibility with the lock component. In this simplified embodiment, the key hash chain is a hash chain for locks applied to individual keys (not to be confused with locks that apply to ranges of keys) of TB1, as a chain of all such locks on all the keys of TB1. Each lock entry represented in the key hash chain may apply to one or more columns of a specified key, or all the columns of the specified key (which would be a row level lock). Each lock entry also indicates what type of lock, such as an S type or an X type. Key hash chain lock compatibility check mod 304 checks the key hash chain for lock compatibility with the lock component by comparing the received lock component, an S lock on column 2 of key 5 of TB1, against the lock entries in the key hash chain for key 5, which includes only the lock entry for the second historical transaction, an X type lock on column 3 for key 5.

Key hash chain lock compatibility check mod 304 finds that key 5 does have a lock already presently executed, and that lock is an incompatible type of lock (as the existing X type lock prevents any other locks from being applied), but this lock is applied to a different target column than the lock component of the received database transaction, as the lock component of the received database transaction is to apply to column 2 and the lock in the key hash chain indicates that it applies to column 3. Therefore, key hash chain lock compatibility check mod 304 checks the key hash chain for lock compatibility with the lock component and finds that the lock component of the received database transaction is compatible with the lock entries of the key hash chain.

Processing proceeds to operation S265, where column bit array lock compatibility check mod 306 checks the column bit array for range-column lock compatibility with the lock component. In this simplified embodiment, the column bit array is an array of bits with a row for the two different lock types (S and X) and a column for every column of TB1. Each bit in the column bit array represents the presence (with a 1 value) or the absence (with a 0 value) of at least one instance of a range-column lock of that lock type in that column but does not indicate which key ranges are applied to any of the range-column locks. Further, the column bit array does not indicate the presence or absence of the locks that are present in the key hash chain, which are locks applied to individual keys; the column bit array serves to indicate the presence or absence of range-column locks only. In this simplified embodiment, the column bit array for TB1 has two rows and three columns, corresponding to the two lock types (X and S) and the three columns of TB1, with row 1 of the column bit array indicating S type locks and row 2 of the column bit array indicating X type locks, while columns 1 through 3 correspond to the respective columns of TB1. From the historical database transactions already present prior to S255 (and concurrently active), the column bit array includes 0 values in all of the positions of the array, with the following exceptions where a 1 value is present instead: (i) row 2, column 1; and (ii) row 2, column 2.

Column bit array lock compatibility check mod 306 checks the column bit array for range-column lock compatibility with the lock component by determining what column is the target column in the lock component of the received database transaction (which in this simplified embodiment is column 2) and compares this against the column bit array to see if there are range-column locks on that column that are of an incompatible lock type. For example, S type locks are not incompatible with each other, but X type locks are incompatible with S or X type locks. In this simplified embodiment, column bit array lock compatibility check mod 306 checks that the column bit array indicates that there is an existing range-column lock of the X type executed on column 2 of TB1. In some alternative embodiments, if column bit array lock compatibility check mod 306 checks the column bit array for range-column lock compatibility with the lock component and finds that the bit column array indicates that there are no range-column locks on the target column that are of an incompatible type, S270 is bypassed and S275 proceeds, saving computing resources for processing the received database transaction.

Processing proceeds to operation S270, where range-column locks lock compatibility check mod 308 checks the range-column locks for lock compatibility with the lock component. In this simplified embodiment, range-column locks lock compatibility check mod 308 checks the range-column locks for lock compatibility with the lock component by comparing the target key and target column of the lock component of the received database transaction to range-column locks in a range lock chain, a similar data construct to the key hash chain, where each range-column lock is arranged based on what type of lock (X or S) of each given range-column lock and further ordered based on the low key of the range of the given range-column lock. Range-column locks lock compatibility check mod 308 searches the range lock chain to identify, if any, range-column locks matching all of the following criteria: (i) a conflicting lock type (such as X if the lock component of the received database transaction corresponds to an S type lock, or an S or X type lock if the lock component of the received database transaction is an X type lock); (ii) matching columns between the column of the range-column lock and the column of the lock component of the received database transaction; and (iii) key ranges for the range-column lock that encompass the key of the lock component of the received database transaction (or the low key and/or high key of the lock component of the received database transaction if the lock component corresponds to a range of keys). If all of the above criteria are not met, than the lock component of the received database transaction is compatible with the present range-column locks executed on TB1 that would be concurrent with the received database transaction. In this simplified embodiment, range-column locks lock compatibility check mod 308 checks the range-column locks for lock compatibility with the lock component and finds that there is a range-column lock that matches only two of the three criteria, which is the range-column lock corresponding to the third historical database transaction. The range column lock corresponding to the third historical database transaction has the following properties: (i) X type lock, which conflicts with the S type lock of the lock component of the received database transaction; (ii) column 2, which is the same column of the lock component of the received database transaction; and (iii) keys 1 through 4, which do not encompass or include key 5, the key of the lock component of the received database transaction.

Processing proceeds to operation S275, where column based lock execution mod 310 executes a column-based lock corresponding to the lock component of the received transaction. In this simplified embodiment, upon finding that the lock component of the received database transaction does not conflict with the locks presently executed on relational database table TB1 that would be concurrent with the lock component of the received database transaction (by checking the key hash chain, the bit column array, and the range lock chain), column based lock execution mod 310 executes the column-based lock corresponding to the lock component of the received transaction by inserting a key-column lock of type S on the key hash chain, appended where the entry for key 5 is in the key hash chain. In some alternative embodiments, if the lock component of the received database transaction was a range-column lock, it would instead be appended to the range lock chain at the appropriate segment, corresponding to the: (i) lock type; (ii) low key of the target key range; and (iii) the target column.

III. Further Comments and/or Embodiments

Some embodiments of the present invention recognize the following facts, potential problems and/or potential areas for improvement with respect to the current state of the art: (i) LOCK is a critical feature for database performance; (ii) currently the lock level could be in the following 4 levels: (a) Table, (b) Partition, (c) Page or (d) Row; (iii) the lower lock level, the highest concurrency but more lock resource needed; (iv) the lock level is determined at table created time; (v) it could not be changed basing on application request; (vi) for example, a table in row level lock, if an application requests a lock on a big range of data, it can only request a lock on the row one by one, which will lead to a lot of lock resource cost or escalate lock to table/partition lock directly which will lead to a bad concurrency; (vii) there is a need for a lock method to enable only lock what they needed in a flexible approach; (viii) locking larger or smaller amounts of data allows trading performance for concurrency; (ix) using page or row locks instead of table or table space locks has the following effects: (a) concurrency usually improves, meaning better response times and higher throughput rates for many users, and (b) processing time and use of storage increases, which is especially evident in batch processes that scan or update a large number of rows; (x) using only table or table space locks has the following effects: (a) processing time and storage usage is reduced, and (b) concurrency can be reduced, meaning longer response times for some users but better throughput for one user; and (xi) currently, there is no column level lock.

Figure 4:
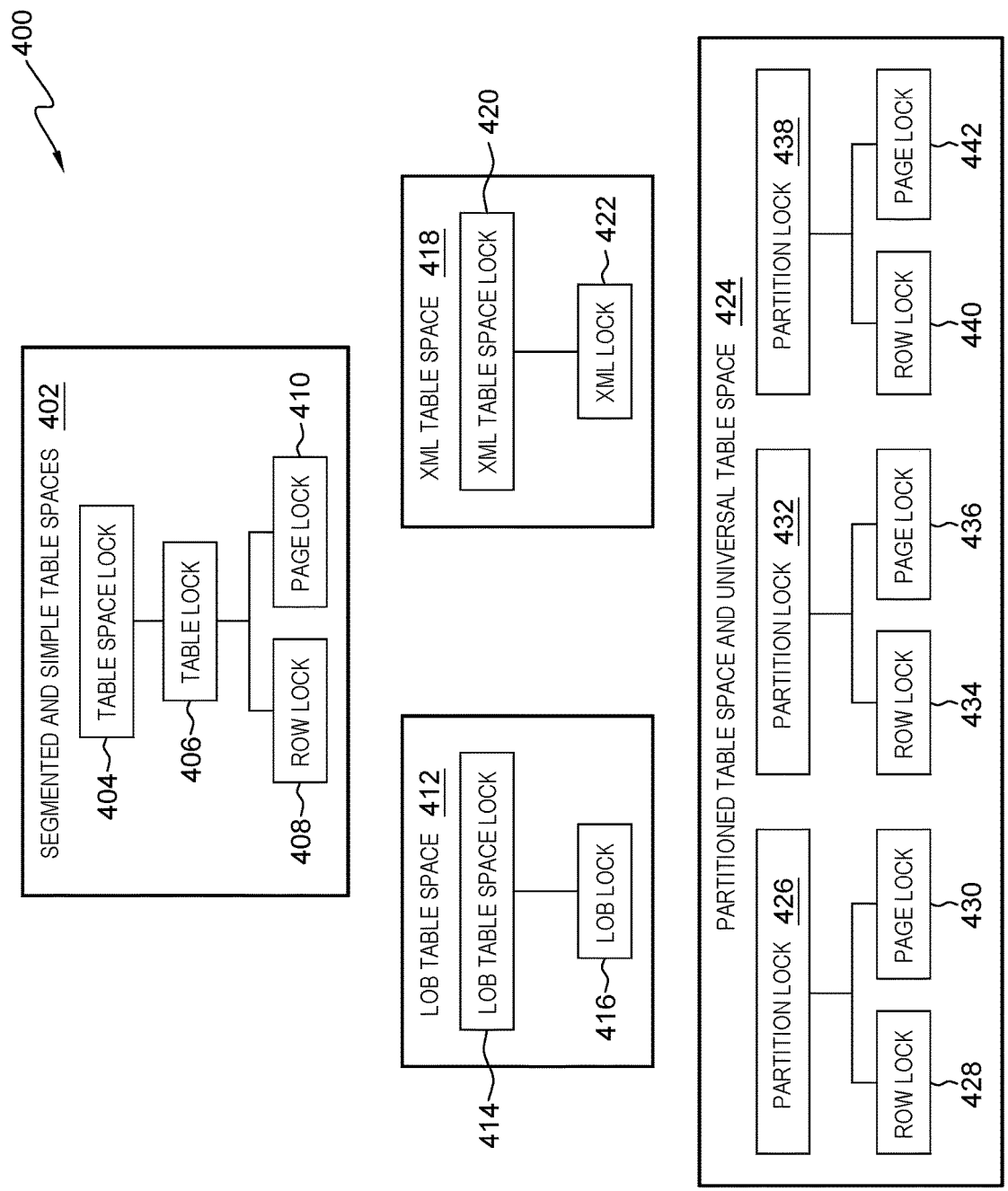
FIG. 4 is a block diagram showing a state of the art database locking schema.

Diagram 400 of FIG. 4 shows hierarchical relationships between various relational database locks, including: (i) segmented and simple table spaces 402, having: (a) table space lock 404, (b) table lock 406, (c) row lock 408, and (d) page lock 410; (ii) LOB table space 412, having: (a) LOB table space lock 414, and (b) LOB lock 416; (iii) XML table space 418, having: (a) XML table space lock 420, and (b) XML lock 422; (iv) partitioned table space and universal table space 424, having: (a) partition lock 426, which further includes: (1) row lock 428, and (2) page lock 430, (b) partition lock 432, which further includes: (1) row lock 434, and (2) page lock 436, and (c) partition lock 438, which further includes: (1) row lock 440, and (2) page lock 442.

Some embodiments of the present invention may include one, or more, of the following operations, features, characteristics and/or advantages: (i) a hybrid lock mechanism is introduced to improve performance of database; (ii) it introduces a type of lock basing on a primary key or key range combine with table columns to realize column level lock and range-column lock; (iii) user could request key-column level lock for row level access and request range-column lock for range data access; (iv) the hybrid lock can not only effectively reduce the lock cost but also improve the concurrency of database; (v) the hybrid lock mechanism has the following characteristics; (vi) enable key or key range lock by requesting lock basing on key or key range: (a) a lock structure has a key lock hash chain with the key lock entry linked in key order and a range lock list chain with the range lock linked in low key order, (b) build separate range lock link list for different lock type (S, X and U), (c) Key lock request with resource name basing on table ID and primary key value, and (d) key range lock request with resource name basing on table ID and primary low key and high key of the range; and (vii) combine key or key range lock with columns to do range-column lock: (a) a column array is added for each key lock entry, build column lock entry list for each key, (b) a range lock with the target column is added in each range lock entry, (c) meanwhile, build a column level range list to link all the entry on the same column together for quick column searching, and (d) build column bitmap to determine whether there is a range lock on the target column.

Some embodiments of the present invention may include one, or more, of the following operations, features, characteristics and/or advantages: (i) request a new lock basing on the new lock structure; (ii) firstly, check whether there is an incompatible lock entry in the key lock chain; (iii) for key-column lock, build hash key basing on the key, then check the column; (iv) set waiter if incompatible; (v) for range-column lock, build hash keys for low key and high key of the range and find them in the list; (vi) check all the lock entry holder between low-key and high key; (vii) set waiter if incompatible; (viii) secondly, check whether there is an incompatible lock entry in the range lock chain; (ix) check column bitmap firstly to determine whether there is range lock on the target column; (x) if not, get the lock resource directly; (xi) check the range entries which have intersection with the requested range/key; (xii) set waiter if incompatible; (xiii) if not, get the lock resource; (xiv) lock manager can dynamically escalate lock from low level to high level basing on lock resource; (xv) dynamically escalate multiple column lock on the same key to row level lock when reaching the threshold; (xvi) automatically escalate multiple key-column level locks to range-column lock when a user holding key-column lock is reaching a threshold; (xvii) dynamically divide the partition to some logical sub-partitions and build key-column hash chain and range-column line chain for each sub-partition; and (xviii) dynamically build multiple level link list for range lock holder list and maintain column bit map for each link level.

Some embodiments of the present invention may include one, or more, of the following operations, features, characteristics and/or advantages: (i) a column level lock; (ii) controlling lock requests—the higher level lock would cause concurrency problem, and lower level lock would cause too many locks; (iii) lock escalation—when there are too many lock on a single database objects, the low level lock would be escalation into higher level locks to reduce the lock number; (iv) retain lock—when the database meets corruptions, the lock should be kept to make the data consistency; (v) lock exit handler—it will handle the lock conditions for the lock; (vi) detail for the design of the column level lock; (vii) controlling lock requests: (a) CREATE/ALTER TABLESPACE LOCKSIZE, (b) default is ANY, which means page initially, (c) USE AND KEEP SHARE|UPDATE|EXCLUSIVE LOCKS SQL clause (ISO RS or RR only), (d) SKIP LOCKED DATA SQL clause(ISO CS or RS only), (e) USECURRENTLYCOMMITTED on BIND/REBIND, and (f) do not wait for uncommitted INSERTs/DELETEs; (viii) lock escalation: (a) Upgrade parent lock to gross S or X(For all parts), (b) Write LGOPXLKP log record if upgrade to X, (c) Write DSNI031I message to console, (d) Unlock child locks, (e) Reset lock counts for pageset, and (f) Remember lock escalation occurred; (ix) Retain Lock: (a) preserve data integrity when a relation database management system member (such as db2) fails, (b) Retained on behalf of a database management system (such as db2) member, (c) normally released by end-restart of that member, and (d) a member cannot release retlocks owned by another member, (e) cannot be negotiated, and (f) might retained in a more restrictive without child lock; and (x) lock exit handler—it will handle the lock conditions for the locks: (a) DBMS Exits, including DBMS passes the entry point addresses of its exit routines and IRLM invoked these exits to communicate with the DBMS, (b) Contention Exit, including SLM gives IRLM control in this exit with a complete, and IRLM can make compatibility and other determinations, (c) Complete Exit, including SLM gives IRLM control when to wait can finally be granted, (d) Notify Exit, including SLM gives IRLM control if IRLM wants to know when contention occurs for a particular resource and IRLM determines in the Contention Exit which IRLMs should have their Notify Exits given control by the SLM, and (e) Event Exit when various system events such as another IRLM failure has occurred.

Some embodiments of the present invention may include one, or more, of the following operations, features, characteristics and/or advantages: (i) concurrent compatible check for the column-lock and row-lock; (ii) provides a hybrid lock mechanism that introduces a type of lock basing on a primary key or key range combine with table columns to realize column level lock and range-column lock; (iii) user could request key-column level lock for row level access and request range-column lock for range data access; (iv) meanwhile, the compatible checking method is provided for column lock and row lock; (v) the application using key-column level lock could concurrently running with application using row level lock; (vi) the method not only effectively reduce the lock cost but also improve the concurrency of database; (vii) the hybrid lock mechanism has the following characteristics: (a) enable key or key range lock by requesting lock basing on key or key range, (b) combine key or key range lock with columns to do range-column lock, (c) request a new lock basing on the new lock structure, (d) firstly, check whether there is an incompatible lock entry in the key lock chain, (e) secondly, check whether there is an incompatible lock entry in the range lock chain, and (f) lock manager can dynamically escalate lock from low level to high level basing on lock resource.

Some embodiments of the present invention may include one, or more, of the following operations, features, characteristics and/or advantages: (i) enable key or key range lock by requesting lock basing on key or key range; (ii) Combine key or key range lock with columns to do range-column lock; (iii) Lock manager can dynamically escalate lock from low level to high level basing on lock resource; (iv) Automatically escalate column lock to row level lock when reaching the thresholds; (v) Automatically escalate column level lock to range-column lock; (vi) Automatically escalate row level lock to range level lock; (vii) Enable key and key range lock by requesting lock basing on key or key range; (viii) For key and key range, the lock status can only be S, U, X lock; (ix) Key lock—Build resource name basing on database id, table id, partition id and primary key; (x) Key range lock—Build resource name basing on database id, table id, partition id and primary low key and high key; (xi) Key lock—Search the key lock by key hash table; (xii) key lock entries are chained in key order; (xiii) Range lock—Search the range lock by lock chain; (xiv) Range lock entry are chained in low_key order; and (xv) Combine key or key range lock with columns to do range-column lock.

Some embodiments of the present invention may include one, or more, of the following operations, features, characteristics and/or advantages: (i) Key lock is based on the primary index key value, which is unique; (ii) For key-column and key range-column, the lock status can only be S, U, X lock; (iii) the key lock could be IS, IX, SIX; (iv) Key-column lock-Build resource name basing on dbid, table id, partition id, key and column bit array; (v) Range-column lock—Build resource name basing on dbid, table id, partition id and low key and high key and column bit array; (vi) Key-column lock—Firstly, search the key entry by key hash table; (vii) then check column array to determine whether there is lock on the target column; (viii) key lock entry are chained in key order; (ix) Range lock—Search the range lock by lock chain; (x) Range lock entry are chained in low_key order; (xi) For all the range lock entry on a Column are chained together; (xii) Firstly, check whether there is an incompatible lock entry in the key lock chain; (xiii) If find the entry list, check column compatibility, and set waiter if incompatible; (xiv) Then, check whether there is an incompatible lock entry in range lock chain; (xv) Check column array firstly to determine whether there is incompatible range on target column; (xvi) if not, add the range directly; (xvii) Check the range entries which have intersection with the requested range, and Set waiter if incompatible; (xviii) How to request a new range-column lock; (xix) Firstly, check whether there is an incompatible lock entry in the key lock chain; (xx) Build hash keys for low key and high key of the range and find them in the list; (xxi) Check all the lock entry holder between low-key and high key; (xxii) Set waiter if incompatible; (xxiii) Then, check whether there is an incompatible lock entry in range lock chain; (xxiv) Check column array firstly to determine whether there is incompatible range on target column; (xxv) if not, add the range directly; and (xxvi) Check the range entries which have intersection with the requested range, and Set waiter if incompatible.

Some embodiments of the present invention may include one, or more, of the following operations, features, characteristics and/or advantages: (i) Lock manager can dynamically escalate lock from low level to high level basing on lock resource; (ii) Request U lock or X lock on primary key column will be automatically escalated to key/range level lock; (iii) Automatically escalate key-column level lock to key level lock when the requesting column number is reaching the thresholds, such as bigger than the half of total column number; (iv) Automatically escalate range-column level lock to range level lock when the requesting column number is reaching the thresholds, such as bigger than the half of total column number; (v) Automatically escalate existed key-column level lock to range-column lock basing on user setting threshold and lock resource; (vi) for example, User threshold=1000—when there are 1000 key-column locks in a key range for a thread, then escalate these lock to a range-column lock on the key range; (vii) When the lock resource for key-column level lock is reaching the limit, escalate the key-column lock to range-column lock even when not reaching the user threshold; (viii) Lock manager can dynamically escalate lock from low level to high level basing on lock resource; (ix) Dynamically divide the partition to some logical sub-partitions for speeding up compatibility checking; (x) Lock manager can dynamically escalate lock from low level to high level basing on lock resource; and (xi) Dynamically build multiple level link list for range lock holder list and maintain col bit map for each link level.

Some embodiments of the present invention may include one, or more, of the following operations, features, characteristics and/or advantages: (i) Flexible on lock strategy; (ii) User can choose which lock level to be used for a special application but not determined in create/alter table; (iii) For RS level lock, request key-column level lock instead of range-column lock, as each key-lock will be released after being processed; (iv) For RR level lock, request range-column lock instead of key-column lock, as all the locks will be released after all keys been processed; and (v) Lock manager could determine/escalate the lock basing on concurrent lock resource and lock request.

Figure 5:
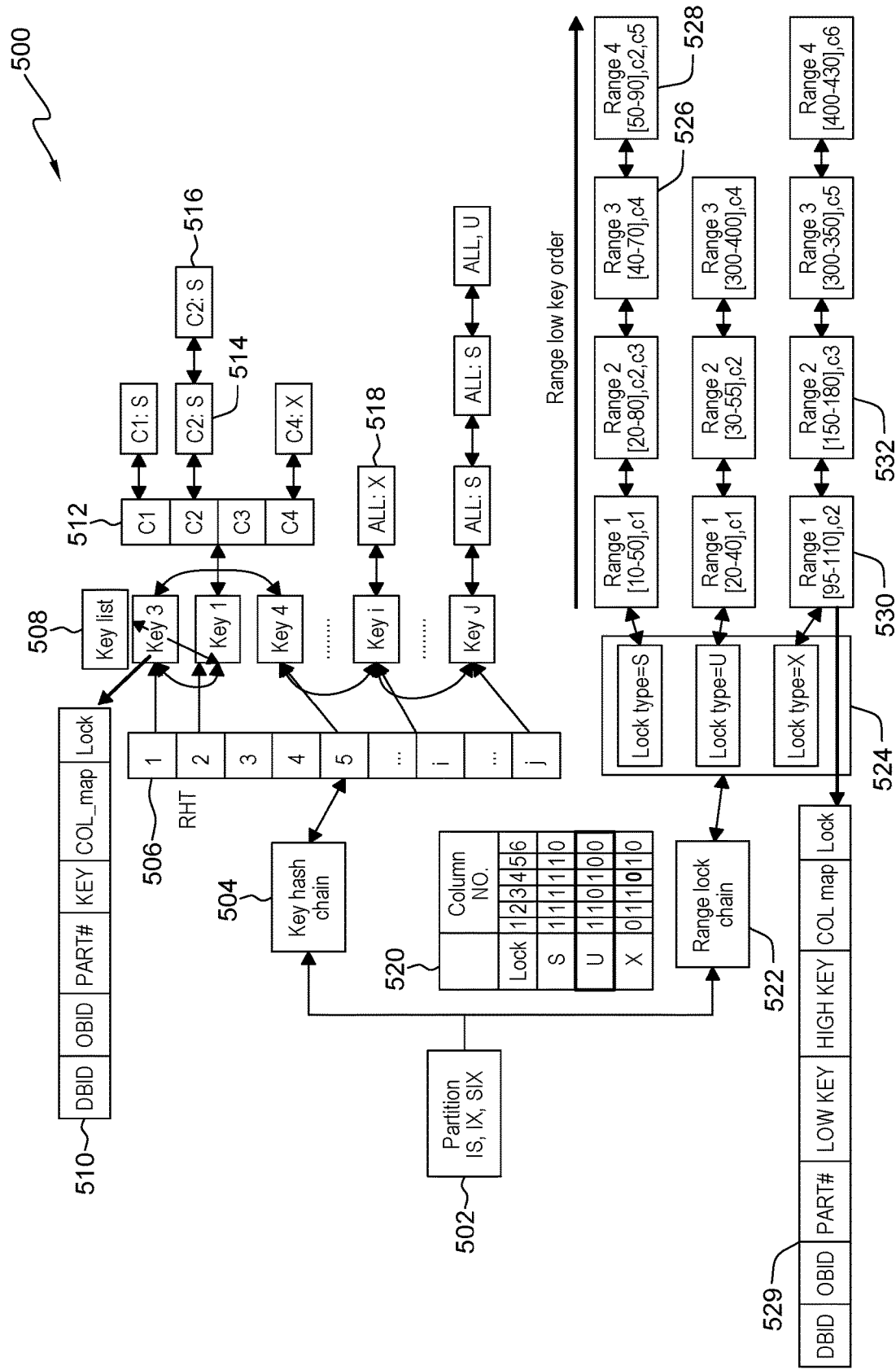
FIG. 5 is a block diagram showing an example of column based locking according to a second embodiment of the present invention.

Block diagram 500 of FIG. 5 shows an embodiment of column based database locks according to an embodiment of the present invention, including: (i) partition 502; (ii) key hash chain 504; (iii) key order 506; (iv) key list 508; (v) key-column lock 510; (vi) columns 512; (vii) key 1 column 2 first shared lock 514; (viii) key 1 column 2 second shared lock 516; (ix) key i exclusive lock 518; (x) column bit array 520; (xi) range lock chain 522; (xii) range lock chain sub types 524; (xiii) lock type S column range 3 lock 526; (xiv) lock type S column range 4 range-column lock 528; (xv) range-column lock 529; (xvi) lock type X column range 1 range-column lock 530; and (xvii) lock type X column range 2 range-column lock 532.

In this diagram, key-column lock 510 shows the composition of a key-column lock, including a database ID, a table ID (or OBID), a partition number, a corresponding key, and a column bit array. The column bit array is linked to a number of keys by a lock manager based on resource management directives. When requesting a new key-column lock, or a lock for a specific column of a specific key, a search is performed on the key hash chain 504 (or key hash table) for incompatible locks, then check column bit array 520 to determine whether if there is an incompatible range-column lock on a target column. If an incompatible range-column lock is found on the target column, then check the key ranges of the locks to determine if there is an intersection for the specific key and the key ranges in the range-column locks. If there is no intersection, the new lock is added.

For adding a new range-column lock, the new range will have a low key and high key specifying the range of keys for the new range-column lock, as well as a target column. Hash keys are generated for the low key and the high key, which are used to locate them in key hash chain 504. Every key between the high key and the low key, inclusive of the high key and the low key, are checked for incompatible locks, and a waiter is set if any are found instead of the new range-column lock. If that search yields no incompatible locks, then column bit array 520 is checked to see if there is any incompatible range-column locks on the target column. If column bit array 520 indicates the presence of an incompatible range-column lock on the target column (for example, if trying to reserve an S type lock on column 2 of keys 80-100, the column bit array indicates that there is an X type lock somewhere in column 2), the ranges of each range-column lock are compared to the low key and high key of the new range-column lock, and, if the low key and high key do not intersect with the ranges of any range-column lock, then the new range-column lock is added. For example, if trying to reserve an S type lock on column 2 of keys 80-100, lock type X column range 1 range-column lock 530 would prevent the new range-column lock, because of intersection between the range of lock type X column range 1 range-column lock 530 on the same column, column 2 keys 95-110, and the low key, high key and column of the new range-column lock, column 2 keys 80-100.

Figure 6:
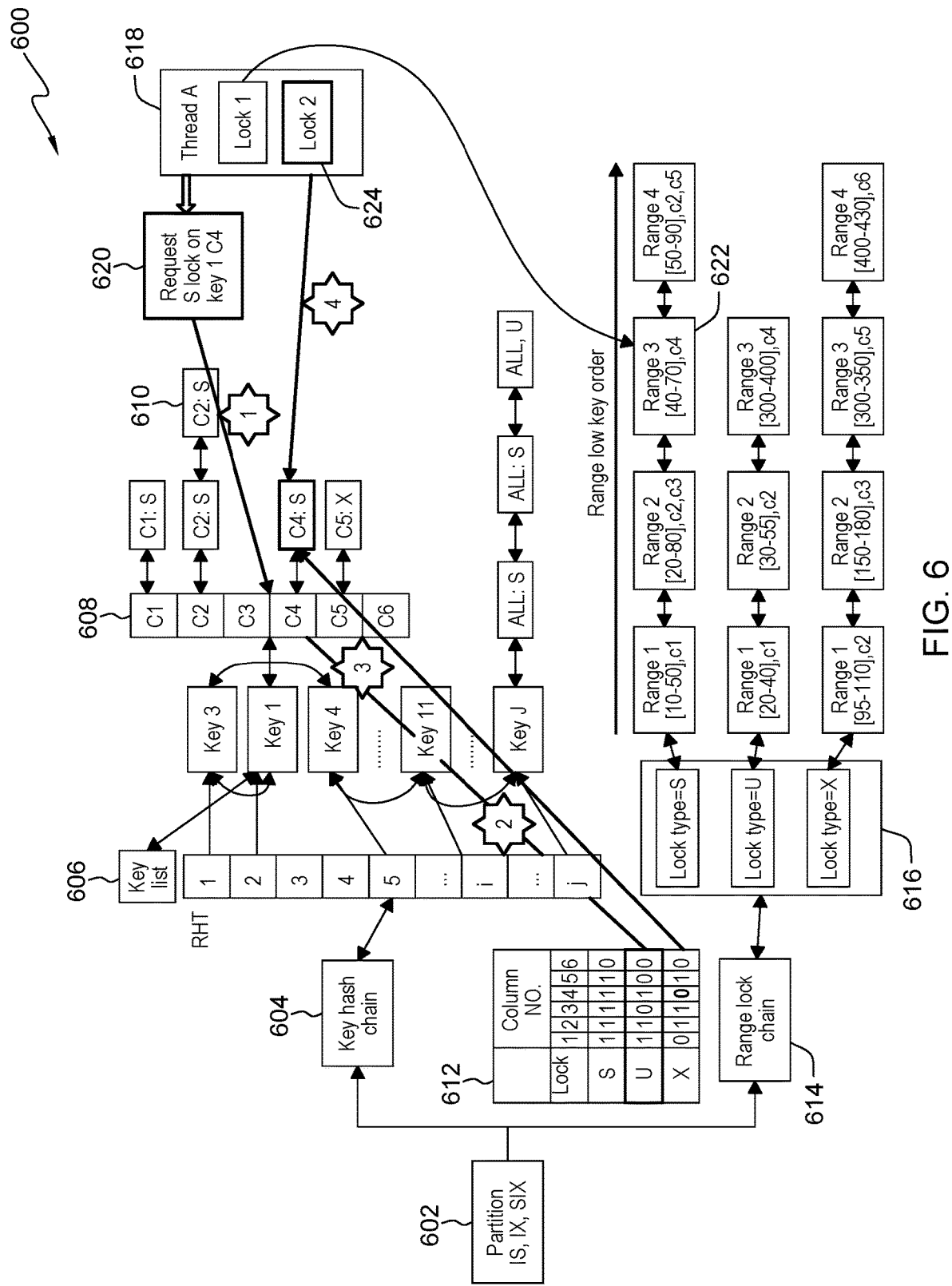
FIG. 6 is a block diagram showing an example of requesting a new column based lock according to the second embodiment of the present invention.

Block diagram 600 of FIG. 6 shows an embodiment of column based database locks according to an embodiment of the present invention, including: (i) partition 602; (ii) key hash chain 604; (iii) key list 606; (iv) columns 608; (v) key 1 column 2 shared locks 610; (vi) column bit array 612; (vii) range lock chain 614; (viii) range lock chain sub types 616; (ix) thread A 618; (x) S lock on key 1 column 4 request 620; (xi) lock type S column range 3 range-column lock 622; and (xii) lock 2 624.

Figure 7:
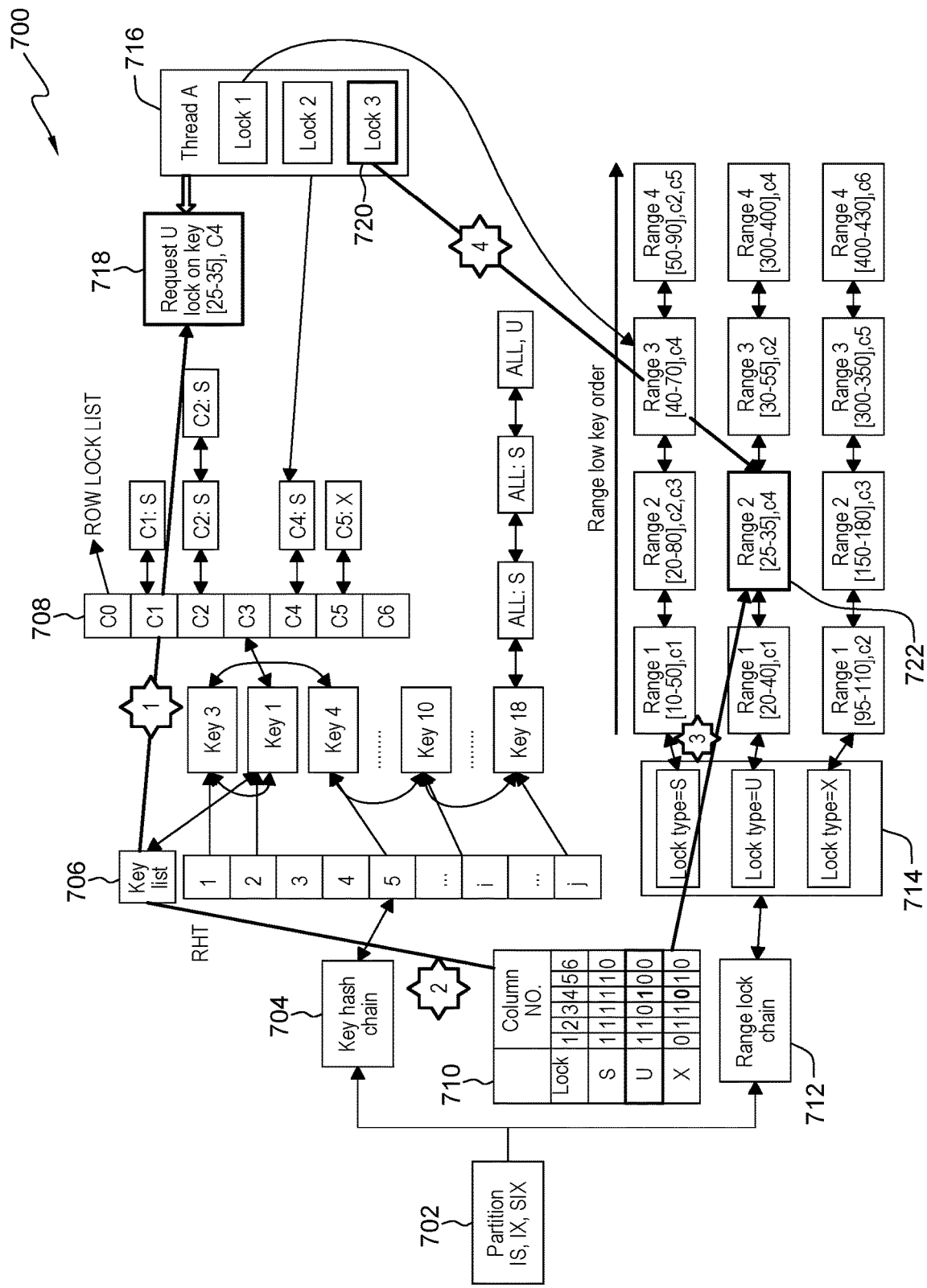
FIG. 7 is a block diagram showing an example of requesting a new column based lock on a range of keys according to the second embodiment of the present invention.

Block diagram 700 of FIG. 7 shows an embodiment of column based database locks according to an embodiment of the present invention, including: (i) partition 702; (ii) key hash chain 704; (iii) key list 706; (iv) columns 708; (v) column bit array 710; (vi) range lock chain 712; (vii) range lock chain sub types 714; (viii) thread A 716; (ix) U lock on key range 25-35 column 4 718; (x) lock 3 720; and (xi) lock type U range 2 range-column lock 722.

Figure 8:
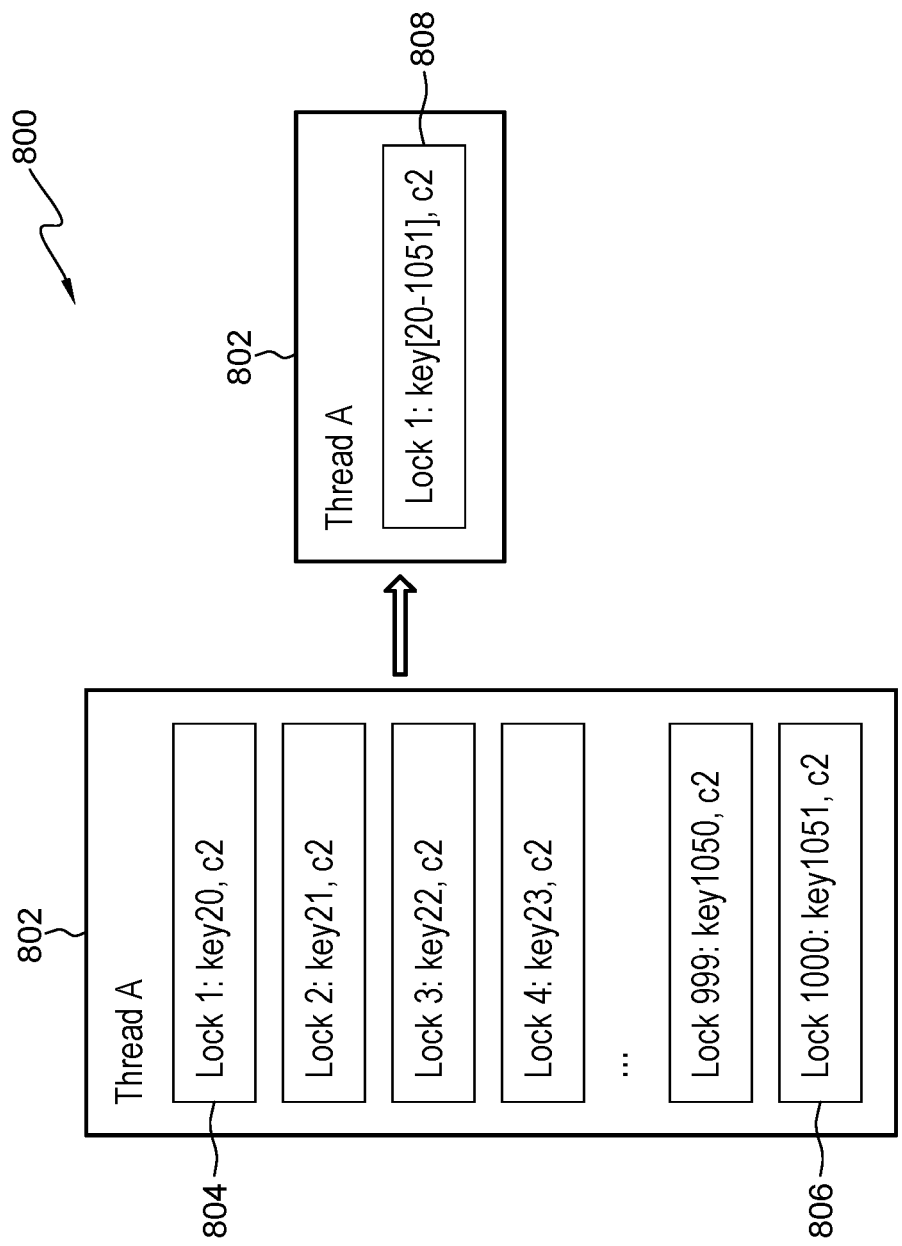
FIG. 8 is a block diagram showing a column to range-column lock escalation according to the second embodiment of the present invention.

Block diagram 800 of FIG. 8 shows an example of escalating a set of column locks to a column-range lock, including: (i) thread A 802; (ii) column lock 1 804; (iii) column lock 1000 806; and (iv) range-column lock 1 808.

Figure 9:
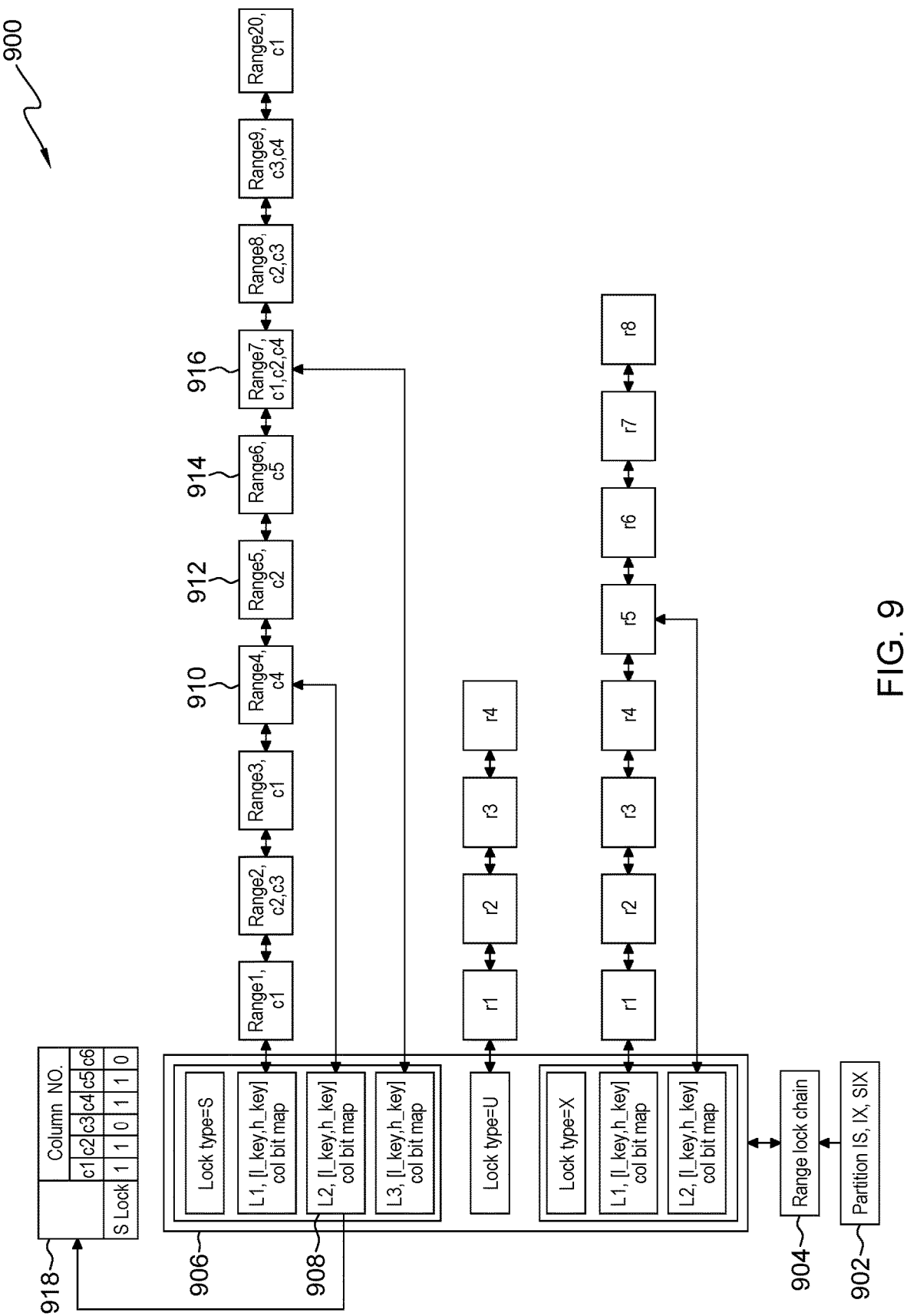
FIG. 9 is a block diagram showing a multi-level link list according to the second embodiment of the present invention.

Block diagram 900 of FIG. 9 shows an example of multiple level link lists for range-column locks according to an embodiment of the present invention, including: (i) partition 902; (ii) range lock chain 904; (iii) range-column lock sub types 906; (iv) lock type S link list L2 908; (v) range 4 lock 910; (vi) range 5 lock 912; (vii) range 6 lock 914; (viii) range 7 lock 916; and (ix) column bit array 918.

Relational database table 1000A is a block diagram showing a visual representation of concurrent locks applied to a relational database table with multiple column and range-column locks according to an embodiment of the present invention, including: (i) X lock type range-column lock 1 1002A; (ii) S lock type range-column lock 2 1004A; (iii) S lock type range-column lock 3 1006A; (iv) X lock type column lock 4 1008A; and (v) S type row lock 5 1010A.

Figure 10A:
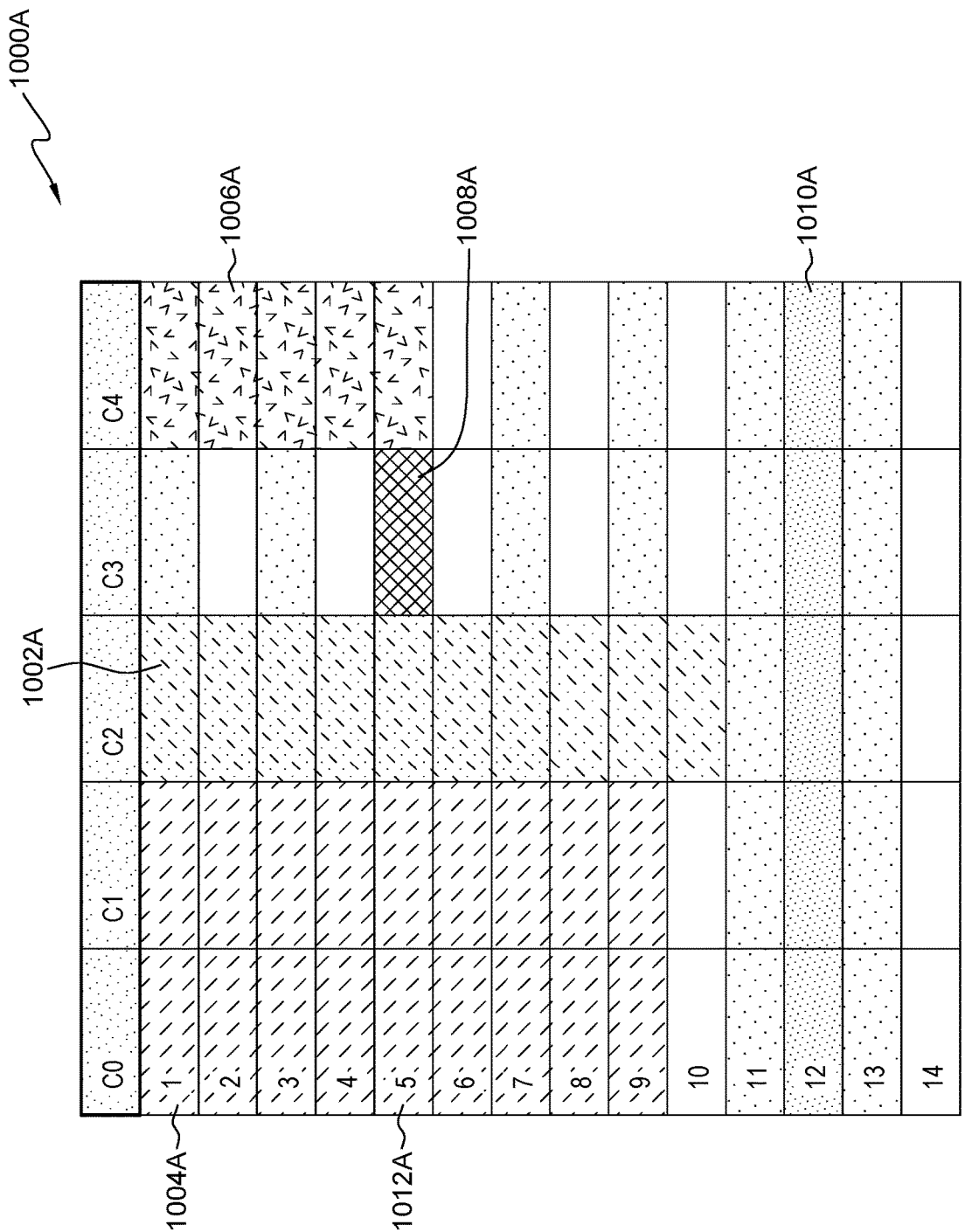
FIG. 10A is a block diagram showing a relational database table with concurrent column based locks according to a third embodiment of the present invention.
Figure 10B:
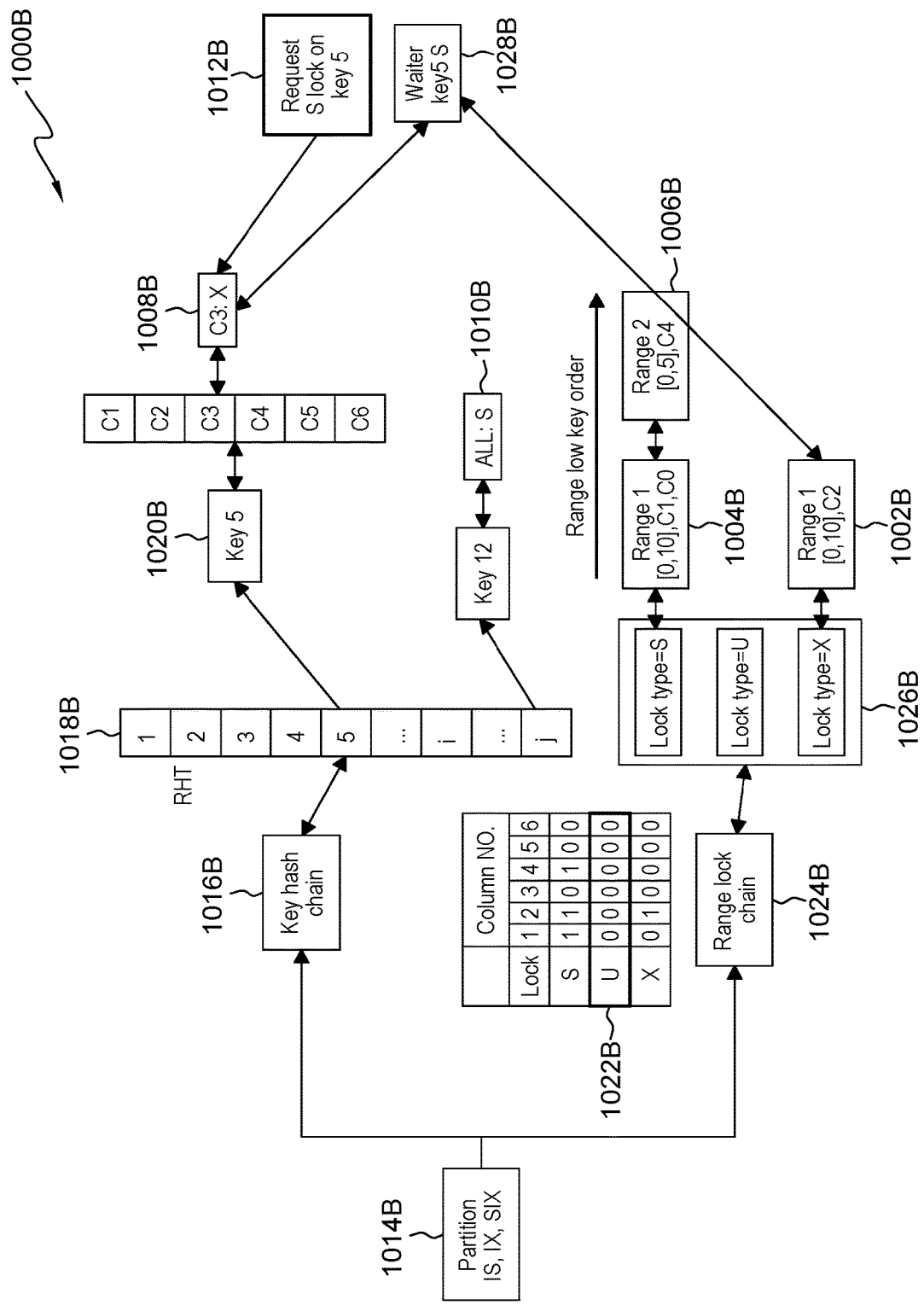
FIG. 10B is a block diagram showing an example of requesting a new column based lock on the relational database table according to the third embodiment of the present invention.

Block diagram 1000B of FIG. 10B shows an example of requesting a new lock on relational database table 1000A of FIG. 10A, including: (i) X lock type range-column lock range 1 1002B; (ii) S lock type range-column lock range 1 1004B; (iii) S lock type range-column lock range 2 1006B; (iv) X lock type column lock 1008B; (v) S lock type row lock 1010B (vi) new lock request 1012B; (vii) partition 1014B; (viii) key hash chain 1016B; (ix) key list 1018B; (x) key 5 1020B; (xi) column bit array 1022B; (xii) range lock chain 1024B; (xiii) range lock chain sub types 1026B; and (xiv) waiter 1028B.

In FIGS. 1000A and 1000B, an example workload is in the process of executing, with relational database table 1000A illustrating how each lock interacts concurrently. In this example workload, five SQL transactions have been executed already: (i) SQL(1)—Update TB1 set C2=C2+1 where C0<10; (ii) SQL(2)—Select C1, C0 from TB1 where C0<10 WITH RR; (iii) SQL(3)—Select C4 from TB1 where C0<=5 WITH RR; (iv) SQL(4)—Update TB1 set C3=C3+100 where C0=5; and (v) SQL(5)—Select * from TB1 where C0=12.

In FIG. 10A, these are shown as the following: (i) SQL(1) is shown as S lock type range-column lock 2 1004A; (ii) SQL(2) is shown as X lock type range-column lock 1 1002A; (iii) SQL(3) is shown as S lock type range-column lock 3 1006A; (iv) SQL(4) is shown as X lock type column lock 4 1008A; and (v) SQL(5) is shown as S type row lock 5 1010A.

In FIG. 10B, these SQL transactions are shown as the following: (i) SQL(1) is shown as X lock type range-column lock range 1 1002B; (ii) SQL(2) is shown as S lock type range-column lock range 1 1004B; (iii) SQL(3) is shown as S lock type range-column lock range 2 1006B; (iv) SQL(4) is shown as X lock type column lock 1008B; and (v) SQL(5) is shown as S lock type row lock 1010B.

Each of these locks, as shown in relational database table 1000A, are compatible with each other. As shown in FIG.

10B, a new lock is requested, shown as 1012B. This new lock corresponds to the following SQL transaction: SQL (6)—Select * from TB1 where C0=5. This transaction calls for an S lock type row lock on key 5, shown as 1020B of FIG. 10B and key 1012A of FIG. 10A. While an S type lock is compatible with other S type locks, such as S lock type range-column lock range 1 1004B and S lock type range-column lock range 2 1006B, but not X lock types, such as X lock type range-column lock range 1 1002B and X lock type column lock 1008B.

The lock manager, when receiving the new lock request 1012B, compares the target key and lock type against key hash chain 1016B and range lock chain 1024B to determine if there are incompatible locks which necessitate instituting a waiter instead of initiating the new lock from SQL(6). Using the target key, key 5, to search the key hash chain, the lock manager finds that it indicates key 5 has an X type lock on column 3, X lock type column lock 1008B, which is incompatible with the lock request for SQL(6) which is a row type lock, locking every column of that key (or row). The lock manager also finds in range lock chain 1024B that there is an incompatible range-column lock, first by searching column bit array 1022B, which indicates that there is an X lock type in column 2 somewhere among the keys. Responsive to finding an incompatible lock type in the target column in column bit array 1022B, the lock manager compares the key in the lock request, key 5, against the key ranges of any incompatible locks (or X lock types in this example), and finds X lock type range-column lock range 1 1002B, which corresponds to an X lock type on column 2 for keys 0 through 10. Since key 5 falls between keys 0 and 10, and X lock type range-column lock range 1 1002B is an X (or exclusive) lock type, the lock request for SQL(6) is incompatible with this as well. The lock manager institutes Waiter 1028B for SQL(6) to wait for the release of the incompatible locks.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

We: this document may use the word "we," and this should be generally be understood, in most instances, as a pronoun style usage representing "machine logic of a computer system," or the like; for example, "we processed the data" should be understood, unless context indicates otherwise, as "machine logic of a computer system processed the data"; unless context affirmatively indicates otherwise, "we," as used herein, is typically not a reference to any specific human individuals or, indeed, and human individuals at all (but rather a computer system).

What is claimed is:

1. A computer-implemented method comprising:
   receiving a relational database transaction for a target relational database table, the relational database transaction including a lock component corresponding to at least one target key with a corresponding at least one target column;
   creating a lock compatibility dataset corresponding to whether the lock component of the relational database transaction is compatible with existing locks presently applied to the target database by:
      comparing the target key and target column to a key hash chain corresponding to locks for specific keys, including column specific locks for a given specific key, and
      comparing the target column to a column bit array, with the column bit array indicative of which columns have range-column locks present; and
   responsive to the lock compatibility data set indicating compatibility between the lock component and the existing locks, adding the lock component to the existing locks.

2. The computer implemented method of claim 1, wherein creating the lock compatibility dataset further includes:
   responsive to the comparison between the target column to the column bit array indicating that a range-column lock applied to the target column exists, comparing the primary key to a range lock chain corresponding to existing range-column locks applied to the target relational database table, where a range-column lock includes information indicative of a column and a range of keys that are locked.

3. The computer implemented method of claim 1, wherein:
   the existing locks may be either S (shared), X (exclusive), or U (update) type locks;
   the lock component may be either an S, X or U type lock; and
   creating the lock compatibility dataset is further based, at least in part, on the type of lock of the lock component and the type of lock of the existing locks.

4. The computer implemented method of claim 1, wherein:
   the lock component is a range-column lock; and
   the at least one target key includes at least a low key and a high key corresponding to a range of keys for the range-column lock of the lock component.

5. The computer implemented method of claim 1, further comprising:

responsive to exceeding a threshold of locks for a given column of the relational database table corresponding to a plurality of locks to the given column for a plurality of different keys, combining the plurality of locks to the given column for the plurality of different keys into a single range-column lock corresponding to a lock on the given column for all keys between a low key corresponding to the lowest key of the plurality of different keys and a high key corresponding to the highest key of the plurality of different keys.

6. The computer implemented method of claim 1, further comprising:
responsive to exceeding a threshold of locks for a given key corresponding to a plurality of separate locks for different columns of the given key, combining the plurality of separate locks for different columns into a single row level lock for the given key, locking every column of the given key.

7. A computer program product comprising:
a machine readable storage device; and
computer code stored on the machine readable storage device, with the computer code including instructions for causing a processor(s) set to perform operations including the following:
receiving a relational database transaction for a target relational database table, the relational database transaction including a lock component corresponding to at least one target key with a corresponding at least one target column,
creating a lock compatibility dataset corresponding to whether the lock component of the relational database transaction is compatible with existing locks presently applied to the target database by:
comparing the target key and target column to a key hash chain corresponding to locks for specific keys, including column specific locks for a given specific key, and
comparing the target column to a column bit array, with the column bit array indicative of which columns have range-column locks present, and
responsive to the lock compatibility data set indicating compatibility between the lock component and the existing locks, adding the lock component to the existing locks.

8. The computer program product of claim 7, wherein creating the lock compatibility dataset further includes:
responsive to the comparison between the target column to the column bit array indicating that a range-column lock applied to the target column exists, comparing the primary key to a range lock chain corresponding to existing range-column locks applied to the target relational database table, where a range-column lock includes information indicative of a column and a range of keys that are locked.

9. The computer program product of claim 7, wherein:
the existing locks may be either S (shared), X (exclusive) or U (update) type locks;
the lock component may be either an S, X or U type lock; and
determining the lock compatibility dataset is further based, at least in part, on the type of lock of the lock component and the type of lock of the existing locks.

10. The computer program product of claim 7, wherein:
the lock component is a range-column lock; and
the at least one target key includes at least a low key and a high key corresponding to a range of keys for the range-column lock of the lock component.

11. The computer program product of claim 7, wherein the computer code further includes instructions for causing the processor(s) set to perform the following operations:
responsive to exceeding a threshold of locks for a given column of the relational database table corresponding to a plurality of locks to the given column for a plurality of different keys, combining the plurality of locks to the given column for the plurality of different keys into a single range-column lock corresponding to a lock on the given column for all keys between a low key corresponding to the lowest key of the plurality of different keys and a high key corresponding to the highest key of the plurality of different keys.

12. The computer program product of claim 7, wherein the computer code further includes instructions for causing the processor(s) set to perform the following operations:
responsive to exceeding a threshold of locks for a given key corresponding to a plurality of separate locks for different columns of the given key, combining the plurality of separate locks for different columns into a single row level lock for the given key, locking every column of the given key.

13. A computer system comprising:
a processor(s) set;
a machine readable storage device; and
computer code stored on the machine readable storage device, with the computer code including instructions for causing the processor(s) set to perform operations including the following:
receiving a relational database transaction for a target relational database table, the relational database transaction including a lock component corresponding to at least one target key with a corresponding at least one target column,
creating a lock compatibility dataset corresponding to whether the lock component of the relational database transaction is compatible with existing locks presently applied to the target database by:
comparing the target key and target column to a key hash chain corresponding to locks for specific keys, including column specific locks for a given specific key, and
comparing the target column to a column bit array, with the column bit array indicative of which columns have range-column locks present, and
responsive to the lock compatibility data set indicating compatibility between the lock component and the existing locks, adding the lock component to the existing locks.

14. The computer system of claim 13, wherein determining the lock compatibility dataset further includes:
responsive to the comparison between the target column to the column bit array indicating that a range-column lock applied to the target column exists, comparing the primary key to a range lock chain corresponding to existing range-column locks applied to the target relational database table, where a range-column lock includes information indicative of a column and a range of keys that are locked.

15. The computer system of claim 13, wherein:
the existing locks may be either S (shared), X (exclusive) or U (update) type locks;
the lock component may be either an S, X or U type lock; and
determining the lock compatibility dataset is further based, at least in part, on the type of lock of the lock component and the type of lock of the existing locks.

16. The computer system of claim 13, wherein:
the lock component is a range-column lock; and
the at least one target key includes at least a low key and a high key corresponding to a range of keys for the range-column lock of the lock component.

17. The computer system of claim 13, wherein the computer code further includes instructions for causing the processor(s) set to perform the following operations:
responsive to exceeding a threshold of locks for a given column of the relational database table corresponding to a plurality of locks to the given column for a plurality of different keys, combining the plurality of locks to the given column for the plurality of different keys into a single range-column lock corresponding to a lock on the given column for all keys between a low key corresponding to the lowest key of the plurality of different keys and a high key corresponding to the highest key of the plurality of different keys.

18. The computer system of claim 13, wherein the computer code further includes instructions for causing the processor(s) set to perform the following operations:
responsive to exceeding a threshold of locks for a given key corresponding to a plurality of separate locks for different columns of the given key, combining the plurality of separate locks for different columns into a single row level lock for the given key, locking every column of the given key.

* * * * *